United States Patent
van de Klashorst

(10) Patent No.: US 8,196,162 B2
(45) Date of Patent: Jun. 5, 2012

(54) VIDEO MEDIA ADVERTISING METADATA

(75) Inventor: Floris van de Klashorst, Rye, NY (US)

(73) Assignee: Nokia Corporation, Espoo (FI)

( * ) Notice: Subject to any disclaimer, the term of this patent is extended or adjusted under 35 U.S.C. 154(b) by 635 days.

(21) Appl. No.: 12/164,655

(22) Filed: Jun. 30, 2008

(65) Prior Publication Data

US 2009/0328113 A1 Dec. 31, 2009

(51) Int. Cl.
*H04N 7/10* (2006.01)
*H04N 7/025* (2006.01)
*G06F 3/00* (2006.01)
*G06Q 30/00* (2012.01)
*H04N 5/445* (2011.01)

(52) U.S. Cl. .............. 725/32; 725/34; 725/35; 725/36; 725/42; 705/14.43; 705/14.4; 705/14.49; 705/14.53; 705/14.66; 705/14.67; 348/563

(58) Field of Classification Search .............. 725/22, 725/32, 34–36, 42, 44–46, 52, 60–61; 705/14.43, 705/14.4, 14.49, 14.53, 14.66, 14.67; 348/563
See application file for complete search history.

(56) References Cited

U.S. PATENT DOCUMENTS

| | | | | |
|---|---|---|---|---|
| 6,546,556 | B1 * | 4/2003 | Kataoka et al. | 725/35 |
| 7,474,595 | B2 * | 1/2009 | Aires et al. | 369/30.06 |
| 7,757,254 | B2 * | 7/2010 | Shoff et al. | 725/44 |
| 2007/0299870 | A1 | 12/2007 | Finch | |
| 2008/0066107 | A1 | 3/2008 | Moonka et al. | |
| 2008/0313669 | A1 * | 12/2008 | Acharya et al. | 725/34 |
| 2009/0150207 | A1 * | 6/2009 | Feng et al. | 705/8 |
| 2009/0276312 | A1 * | 11/2009 | Feng et al. | 705/14.52 |

FOREIGN PATENT DOCUMENTS

| | | |
|---|---|---|
| MX | PA02004752 | 8/2002 |
| WO | 02089482 | 11/2002 |
| WO | 03067394 | 8/2003 |

OTHER PUBLICATIONS

"Welcome to AdSense", downloaded Jun. 30, 2008 from <https://www.google.com/adsense/login/en_US/?gsessionid=gKnjUtLEFG8>, 1 page.
"InVideo Ads", downloaded Jun. 30, 2008 from <http://www.youtube.com/t/ads_invideo>, 5 pages.
Ad Network—Live Demo, downloaded Jun. 30, 2008 from <http://videoegg.com/adnetwork/demo>, 1 page.
"3GPP TS 26.142 v7.2.0 (Dec. 2007) 3rd Generation Partnership Project; Technical Specification Group Services and System Aspects' Dynamic and Interactive Multimedia Scenes; (Release 7)", 3rd Generation Partnership Project, Dec. 2007, 38 pages.

* cited by examiner

*Primary Examiner* — Hoang-Vu A Nguyen-Ba
(74) *Attorney, Agent, or Firm* — Ditthavong Mori & Steiner, P.C.

(57) ABSTRACT

Advertisements and other media content may be placed with or in content items according to contextual information relating to particular portions of the content. For example, advertisements may be matched to products shown in a movie, lyrics used in a song or places named in a work of literature. The contextual information may be defined in a contextual data track of the content item similar to video tracks for video and audio tracks for audio. Accordingly, a content provider or a viewing device may, prior to or during play of a content item, automatically request advertisements or other media content based at least in part on the contextual information stored in the contextual data track of the content item. In one or more arrangements, contextual data may be automatically generated using various image, audio and text processing techniques.

34 Claims, 16 Drawing Sheets

VIDEO MEDIA ADVERTISING METADATA

Some aspects of the invention generally relate to methods and systems for providing advertisements and other types of media content.

BACKGROUND

Advertising has become an increasingly important source of revenue in many industries. Electronic media and content providers, for example, rely heavily on advertising to be able to provide services to users for free or at a reduced cost. In many cases, advertising revenue and revenue generated by products or services advertised may be increased by selecting and placing contextually relevant advertisements. Currently, however, the automatic selection and placement of advertisements tend to be high level matching based on information such as overall theme, subject matter or title of the content item rather than specific contexts associated with the content. For example, if a movie scene includes the drinking of a glass of soda, it may be desirable for an advertiser to place a soda (e.g. Pepsi) commercial in the scene, next to it or in close proximity.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some aspects of the present disclosure relate to the use of contextual information to place ads within a content item. Contextual data such as keywords, phrases and the like may be stored as a contextual data track in association with a content item. For example, a contextual data track may be stored in a content item similar to the way audio and video tracks are stored as components of a movie or show. The contextual data track may be predefined such that a content provider or a viewing device may extract contextual data from the track and request advertisements based thereon. In one example arrangement, ads may be requested during rendering or play of the content item. For example, as an advertisement slot approaches during play of a movie, a request may be sent to an advertisement server requesting one or more advertisements matching contextual data associated with the slot. Ads may be requested by a content provider or by a viewing device of a user requesting content or both.

According to another example aspect, contextual data may be stored as metadata along with other ad placement criteria such as a physical location of an ad within a movie scene, a temporal location within the content item (e.g., a start time for an advertisement slot), size specifications, duration limitations, transparency levels, rating and the like. Such metadata may include multiple sets of ad placement criteria for defining appropriate advertisement for different advertisement slots.

According to another example aspect, user preferences or other profile information may be used to select an advertisement in addition to the ad placement criteria specified in metadata. An ad broker may be provided with the user profile information in an ad request or, alternatively or additionally, retrieve user information from a database. Thus, in one example, an ad broker may select an advertisement that meets the duration and size criteria specified in the content item metadata while also matching user demographic information.

According to another example aspect, the aspects described herein may similarly be applied to or used for other types of media content such as public service announcements, soundtracks, subtitles and the like.

BRIEF DESCRIPTION OF THE DRAWINGS

Certain embodiments are illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1:
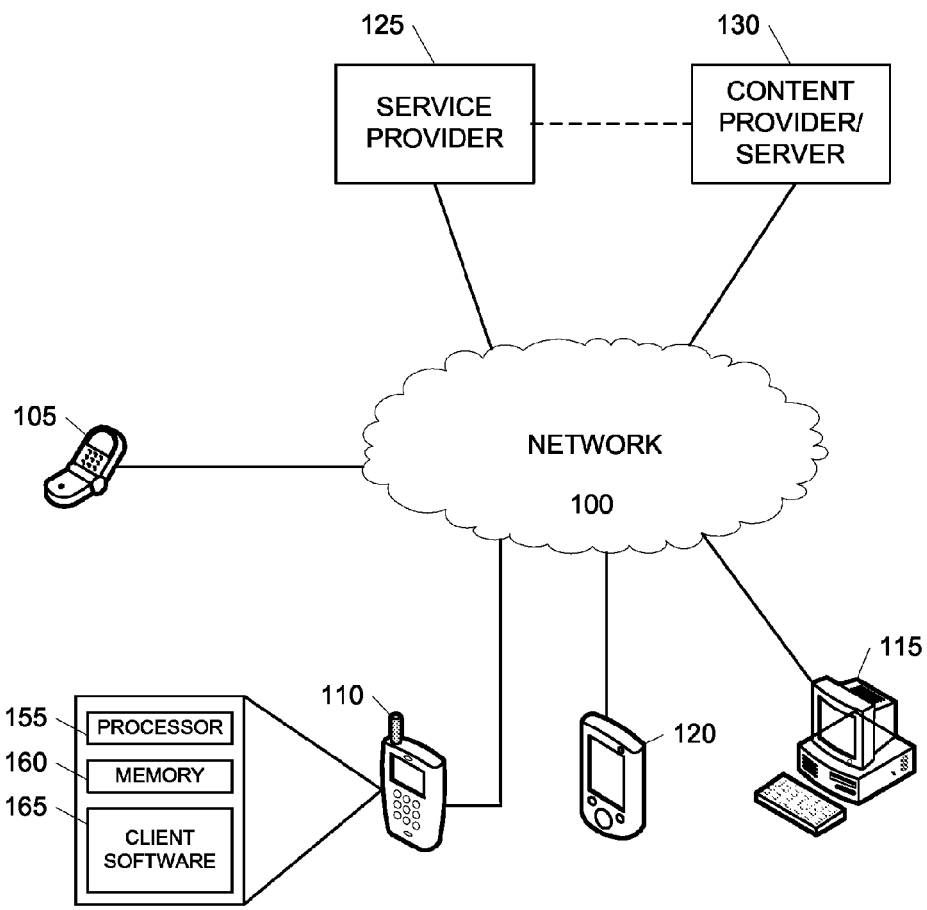
FIG. 1 illustrates a block diagram of an example communication network in which one or more embodiments may be implemented.

FIG. 1 illustrates an example communication network through which various inventive principles may be practiced. A number of computers and devices including mobile communication device 105, mobile phone 110, personal digital assistant (PDA) or mobile computer 120, personal computer (PC) 115, service provider 125 and content provider 130 may communicate with one another and with other devices through network 100. Network 100 may include wired and wireless connections and network elements, and connections over the network may include permanent or temporary connections. Communication through network 100 is not limited to the illustrated devices and may include additional mobile or fixed devices such as a video storage system, an audio/video player, a digital camera/camcorder, a positioning device such as a GPS (Global Positioning System) device or satellite, a television, an audio/video player, a radio broadcasting receiver, a set-top box (STB), a digital video recorder, remote control devices and any combination thereof.

Although shown as a single network in FIG. 1 for simplicity, network 100 may include multiple networks that are interlinked so as to provide internetworked communications. Such networks may include one or more private or public packet-switched networks (e.g., the Internet), one or more private or public circuit-switched networks (e.g., a public switched telephone network), a cellular network configured to facilitate communications to and from mobile communication devices 105 and 110 (e.g., through use of base stations, mobile switching centers, etc.), a short or medium range wireless communication connection (e.g., Bluetooth®, ultra wideband (UWB), infrared, WiBree, wireless local area network (WLAN) according to one or more versions of Institute of Electrical and Electronics Engineers (IEEE) standard no. 802.11), or a high-speed wireless data network such as Evolution-Data Optimized (EV-DO) networks, Universal Mobile Telecommunications System (UMTS) networks, Long Term Evolution (LTE) networks or Enhanced Data rates for GSM Evolution (EDGE) networks. Devices 105-120 may use various communication protocols such as Internet Protocol (IP), Transmission Control Protocol (TCP), Simple Mail Transfer Protocol (SMTP) among others known in the art. Various messaging services such as Short Messaging Service (SMS) and/or Multimedia Message Service (MMS) may also be included.

Devices 105-120 may be configured to interact with each other or other devices, such as content server 130 or service provider 125. In one example, mobile device 110 may include client software 165 that is configured to coordinate the transmission and reception of information to and from content provider/server 130. In one arrangement, client software 165 may include application or server specific protocols for requesting and receiving content from content server 130. For example, client software 165 may comprise a Web browser or mobile variants thereof and content provider/server 130 may comprise a web server. Billing services (not shown) may also be included to charge access or data fees for services rendered. In one arrangement where service provider 125 provides cellular network access (e.g., a wireless service provider), client software 165 may include instructions for access and communication through the cellular network. Client software 165 may be stored in computer-readable memory 160 such as read only or random access memory in device 110 and may include instructions that cause one or more components (e.g., processor 155, a transceiver, and a display) of device 110 to perform various functions and methods including those described herein.

Figure 2:
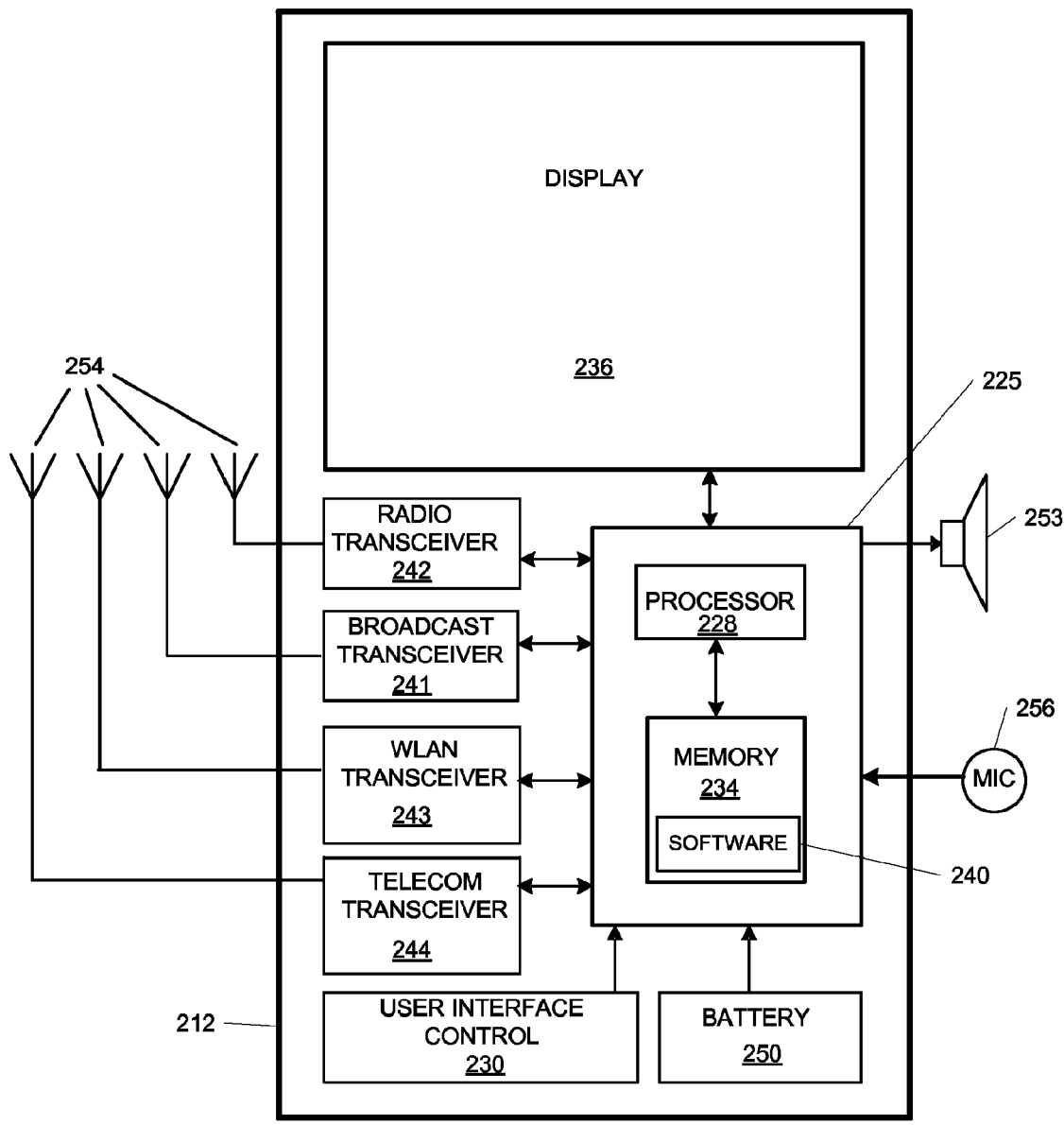
FIG. 2 illustrates a block diagram of an example communication device according to one or more aspects described herein.

FIG. 2 illustrates an example computing device such as mobile device 212 that may be used in network 100 of FIG. 1. Mobile device 212 may include a controller 225 connected to a user interface control 230, display 236 and other elements as illustrated. Controller 225 may include one or more processors 228 and memory 234 storing software 240. Mobile device 212 may also include a battery 250, speaker 252 and antenna 254. User interface control 230 may include controllers or adapters configured to receive input from or provide output to a keypad, touch screen, voice interface (e.g. via microphone 256), function keys, joystick, data glove, mouse and the like.

Computer executable instructions and data used by processor 228 and other components of mobile device 212 may be stored in a storage facility such as memory 234. Memory 234 may comprise any type or combination of read only memory (ROM) modules or random access memory (RAM) modules, including both volatile and nonvolatile memory such as disks. Software 240 may be stored within memory 234 to provide instructions to processor 228 such that when the instructions are executed, processor 228, mobile device 212 and/or other components of mobile device 212 are caused to perform various functions or methods such as those described herein. Software may include both applications and operating system software, and may include code segments, instructions, applets, pre-compiled code, compiled code, computer programs, program modules, engines, program logic, and combinations thereof. Computer executable instructions and data may further be stored on computer readable media including electrically erasable programmable read-only memory (EEPROM), flash memory or other memory technology, CD-ROM, DVD or other optical disk storage, magnetic cassettes, magnetic tape, magnetic storage and the like.

Mobile device 212 or its various components may be configured to receive, decode and process various types of transmissions including digital broadband broadcast transmissions that are based, for example, on the Digital Video Broadcast (DVB) standard, such as DVB-H, DVB-H+, or DVB-MHP, through a specific broadcast transceiver 241. Other digital transmission formats may alternatively be used to deliver content and information of availability of supplemental services. Additionally or alternatively, mobile device 212 may be configured to receive, decode and process transmissions through FM/AM Radio transceiver 242, wireless local area network (WLAN) transceiver 243, and telecommunications transceiver 244. Transceivers 241, 242, 243 and 244 may, alternatively, include individual transmitter and receiver components.

Although the above description of FIG. 2 generally relates to a mobile device, other devices or systems may include the same or similar components and perform the same or similar functions and methods. For example, a stationary computer such as PC 115 (FIG. 1) may include the components described above and may be configured to perform the same or similar functions as mobile device 212 and its components.

Figure 3:
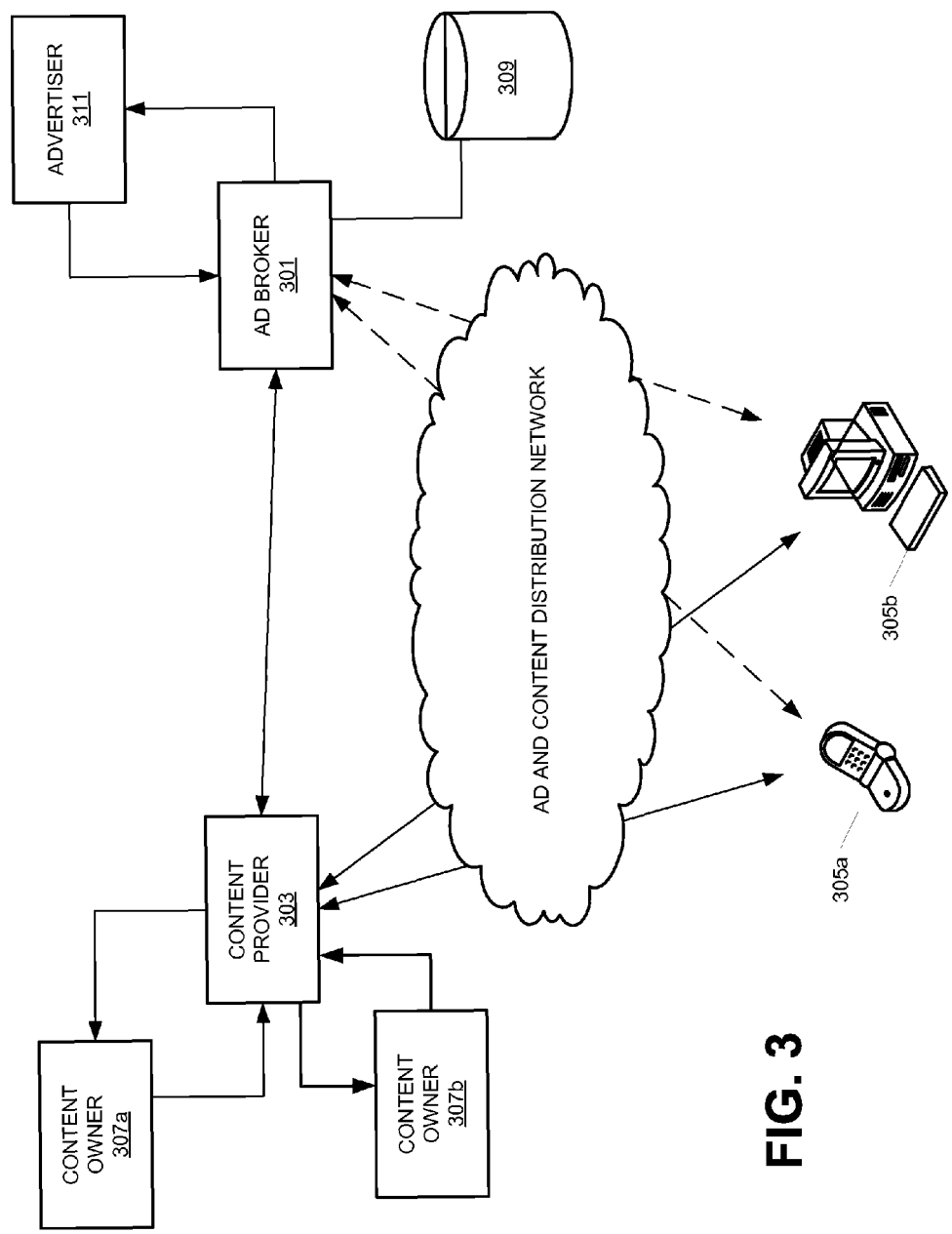
FIG. 3 illustrates an example advertisement and content distribution environment in which one or more aspects described herein may be used.

According to one or more aspects described herein, devices such as mobile device 212 may be configured to display or otherwise render various types of content including video, audio, image, text and the like, and in any combination of the aforementioned. Such content is often associated with one or more advertisements to generate revenue (e.g., by charging advertisers for advertising time and/or space). FIG. 3 illustrates an example embodiment of an ad and content distribution environment in which advertisements are distributed through an ad broker 301 while content items are provided by content owners 307a and 307b through a content provider 303. Content owners 307a and 307b may include movie studios, distributors, individuals and the like. Ad broker 301 may provide advertisements to content provider 303 for inclusion in a content item requested by user device 305*a* or 305*b*. In one example, ad broker 301 may retrieve ads from a local storage such as database 309 or from an advertiser 311 in response to an ad request. Once the advertisements have been received from ad broker 301, the ads may be embedded or otherwise associated with the requested content item. Subsequently, the content provider 303 may deliver the content item to a requesting user's device such as device 305*a* or 305*b*. Alternatively, ad broker may bypass content provider 303 and provide the advertisements to user device 305*a* or 305*b*, itself. User devices 305*a* and 305*b* may then combine the content item(s) received from provider 303 with the received advertisement(s). Content items may include video, audio, text, image and/or combinations thereof and may further include streaming content, broadcast/multicast/unicast programming, downloaded content and the like. In one or more arrangements, ad broker 301 may factor user preferences into the selection of an advertisement.

Figure 4:
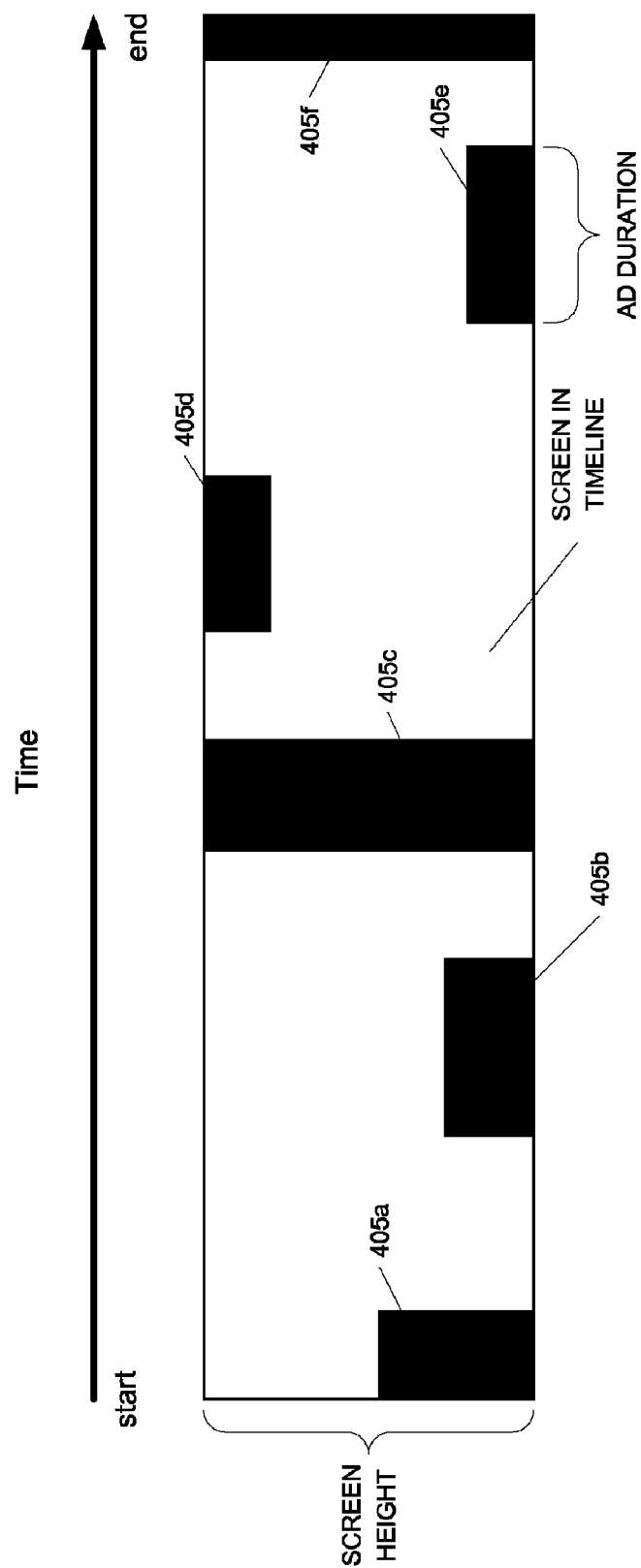
FIG. 4 illustrates an example arrangement of advertisements in a content item according to aspects described herein.

While the manner in which an ad is delivered may provide efficiencies in an advertising environment, ad placement is also often of significant consequence. Ad placement relates not only to the location of an ad on a screen (e.g., for a video), but also to size, duration, frequency, temporal placement, volume, appearance and the like. FIG. 4 illustrates one example embodiment of advertisement placement in video content. As illustrated, advertisements 405*a-f* may vary in duration, position, size and start time. For example, some advertisements such as ads 405*c* and 405*f* may occupy the entire screen while ads 405*a*, 405*b*, 405*d* and 405*e* might only occupy a portion of the display. Similarly, some ads such as ad 405*e* may have a longer duration than others (e.g., ad 405*c*). The placement of advertisements may be defined based on various criteria and considerations. For example, a content owner may have an interest in the type, placement and length of advertisements that are associated with his or her content. After all, the owner of a family oriented program would probably want to avoid associating sexually charged advertisements with the program. In addition to content owners, advertisers may also have a substantial interest in how and where ads are placed since the advertiser's revenue is linked closely to the appeal of its ad.

Figure 5:
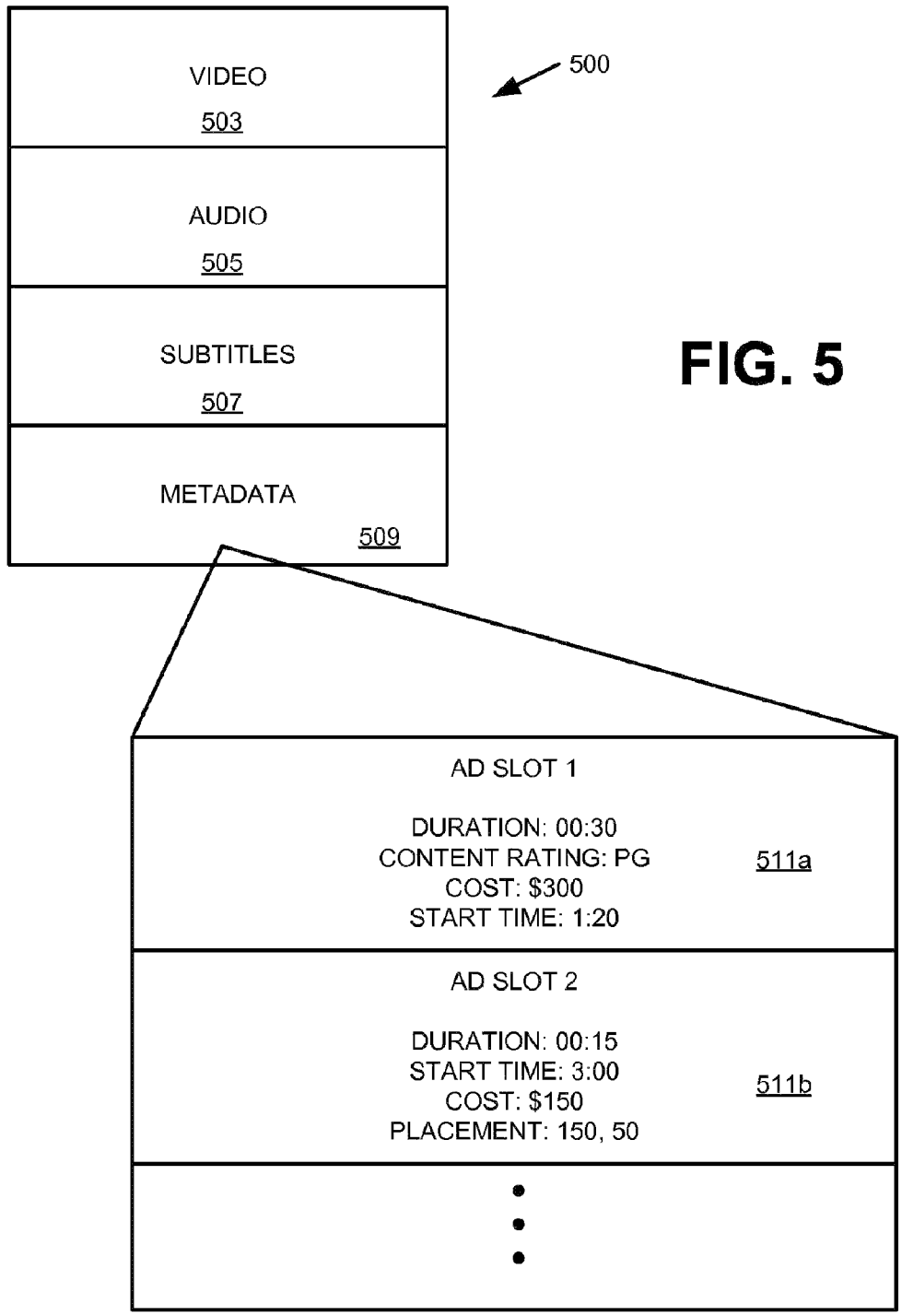
FIG. 5 illustrates an example content item data structure storing ad placement metadata according to aspects described herein.

Ad placement preferences can vary significantly from content owner to content owner (or other content stake holders such as distributors and creators). For example, some content owners might not mind if ads are overlaid over portions of the content while others might only want advertisements placed in predefined advertisement slots. FIG. 5 illustrates one example embodiment of a content item data structure that includes metadata for defining acceptable or desired advertisement attributes. Content item 500 may include one or more content tracks such as video track 503, audio track 505 and subtitle data 507. When rendering content item 500, the various tracks 503, 505 and 507 may be combined and synchronized to provide a seamless multimedia experience. Additionally, advertisement metadata 509, such as ad placement criteria, may specify one or more criteria that are to be met for ad selection and inclusion during play of content item 500. For example, metadata 509 may specify size limitations, ad length/duration limitations, content rating (e.g., G, PG, PG-13, R) specifications, payment specifications, transparency specifications (e.g., if ads are allowed to overlay content programming) and the like. Payment specifications may be used to define a cost of placement in content item 500, an account to which payment is to be made and the like. Thus, a content owner may specify in metadata 509 that the cost of ad placement in content item 500 is $300 and indicate a bank account or other payment account to which the funds are to be transferred. In one example, metadata 509 may specify that an advertisement for an advertisement slot must be, for example, 30 seconds in duration, have a content rating of PG or under and be ready for rendering at 2 minutes and 32 seconds into the content.

Metadata 509 may define multiple locations or advertisement slots in content item 500 where ads are permitted. Such locations may be defined by a playtime, vertical and horizontal location in a content display or window, size i.e. height and width of the content display, and/or combinations thereof. For example, a content owner may define advertisement slots 511*a, b* in metadata 509 of content item 500 so that ad placement is limited to these specified portions. Further, each advertisement slot 511*a, b* may include a set of placement criteria. For example, ad slot 511*a* may define criteria for a first advertisement slot beginning at 1 minute and 20 seconds of play while ad slot 511*b* may define ad placement criteria for a second advertisement slot beginning at the $3^{rd}$ minute of play. In another example, ad slot 511*b* may specify coordinates (i.e., 150, 50) where an ad is to be placed.

Figure 6:
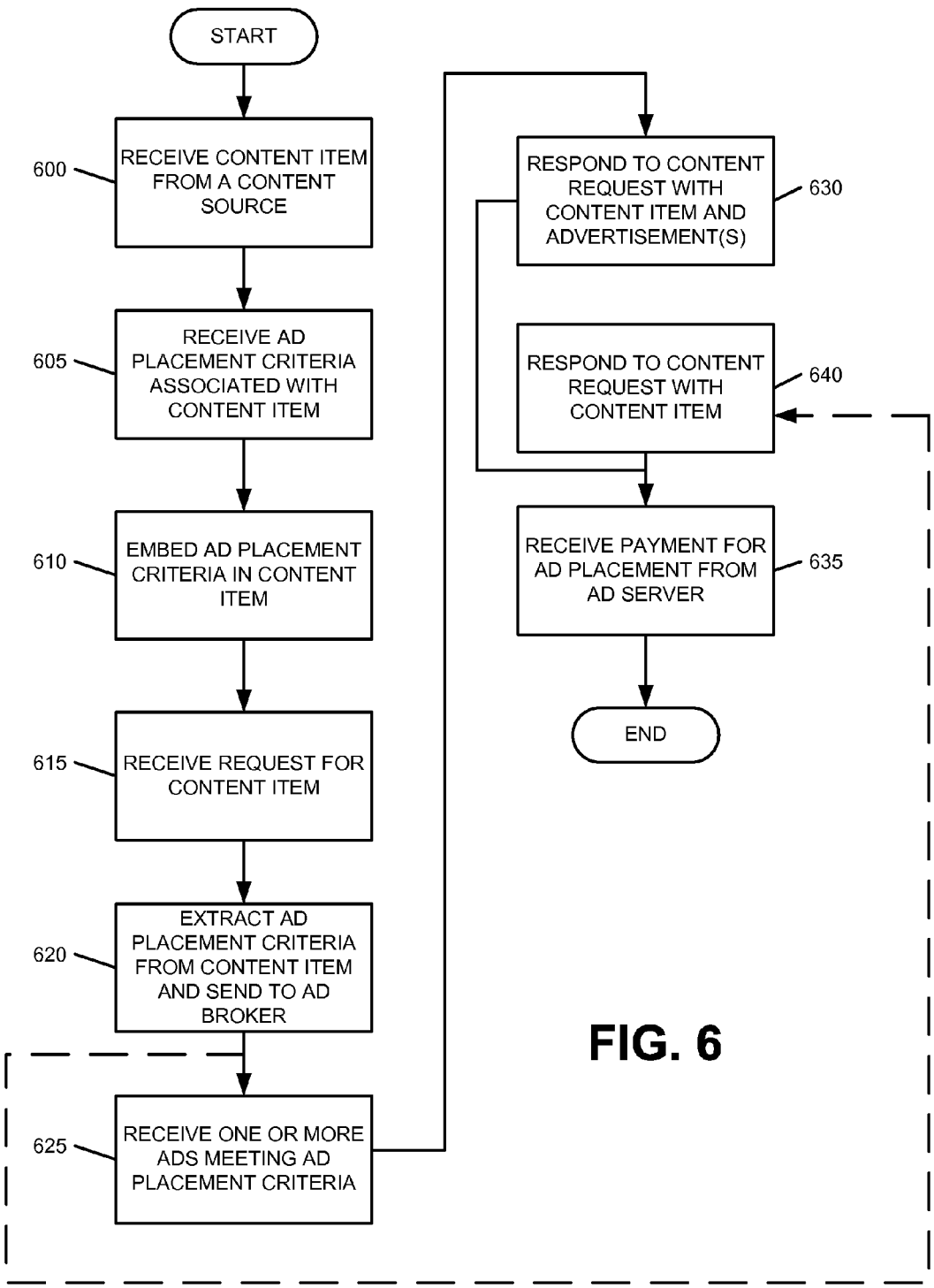
FIG. 6 is a flowchart illustrating an example method for processing content requests according to aspects described herein.

Once ad placement criteria have been defined and associated with a particular content item, the criteria may be evaluated and one or more ads may be selected based on the criteria. FIG. 6 is a flowchart illustrating an example of a method of ad placement in a content item. Beginning in step 600, a content provider may receive a content item from a content source such as a content owner or distributor. In step 605, one or more ad placement criteria may be received by the content provider in association with the content item. Ad placement criteria may be specified by a content owner, a content distributor, other stake-holders in the content, the content provider and the like. Further, ad placement criteria may include default specifications if no customized criteria are received. The content server may subsequently embed the one or more ad placement criteria in the content item in step 610. For example, the content server may add the specifications or other criteria as metadata in the content item as discussed herein. In alternative embodiment the ad replacement criteria may be already included in the content item by the content owner.

In step 615, the content provider may receive a request for the content item. The request may be received, for example, from a communication device (e.g., mobile device 212 of FIG. 2) of a requesting user. In response to the request, the content provider may extract or find the ad placement criteria stored in the metadata of the requested content item and forward the metadata to an ad server or broker, requesting one or more advertisements matching the specified criteria in step 620. Additionally, in some arrangements, the content provider may provide user preferences or profile information to the ad broker as additional ad selection criteria. User profile information and preferences may include user browsing history, interests, one or more play lists, gender, age, geographic location, devices owned by the user and the like. In step 625, the content provider may receive one or more advertisements that meet the criteria specified in the content item from the ad server or broker. In step 630, the content provider may respond to the request by transmitting the requested content item along with the one or more advertisements. In one or more configurations, the content provider may embed or otherwise combine the advertisements with the content item prior to transmitting the content item to the requesting user or device. The content provider may insert advertisements into the content item in accordance with the ad placement specifications e.g., size, time, vertical and horizontal placement. In one example, the content provider may place the advertisement into a content stream corresponding to requested streaming content. In another example, the content provider may add the advertisement into the content item using image, audio or text processing techniques. In some instances, the content provider may further receive payment from the ad server or broker in step 635.

In another arrangement, upon requesting the one or more advertisements in step 620, the content provider may transmit the content item to a requesting user or device without the advertisements in step 640. Thus, instead of transmitting the content item with advertisements, the content provider may request that the ad broker transmit the advertisement(s) to the requesting user or devices directly. Payment may similarly be received from the ad server or broker in step 635.

Figure 7:
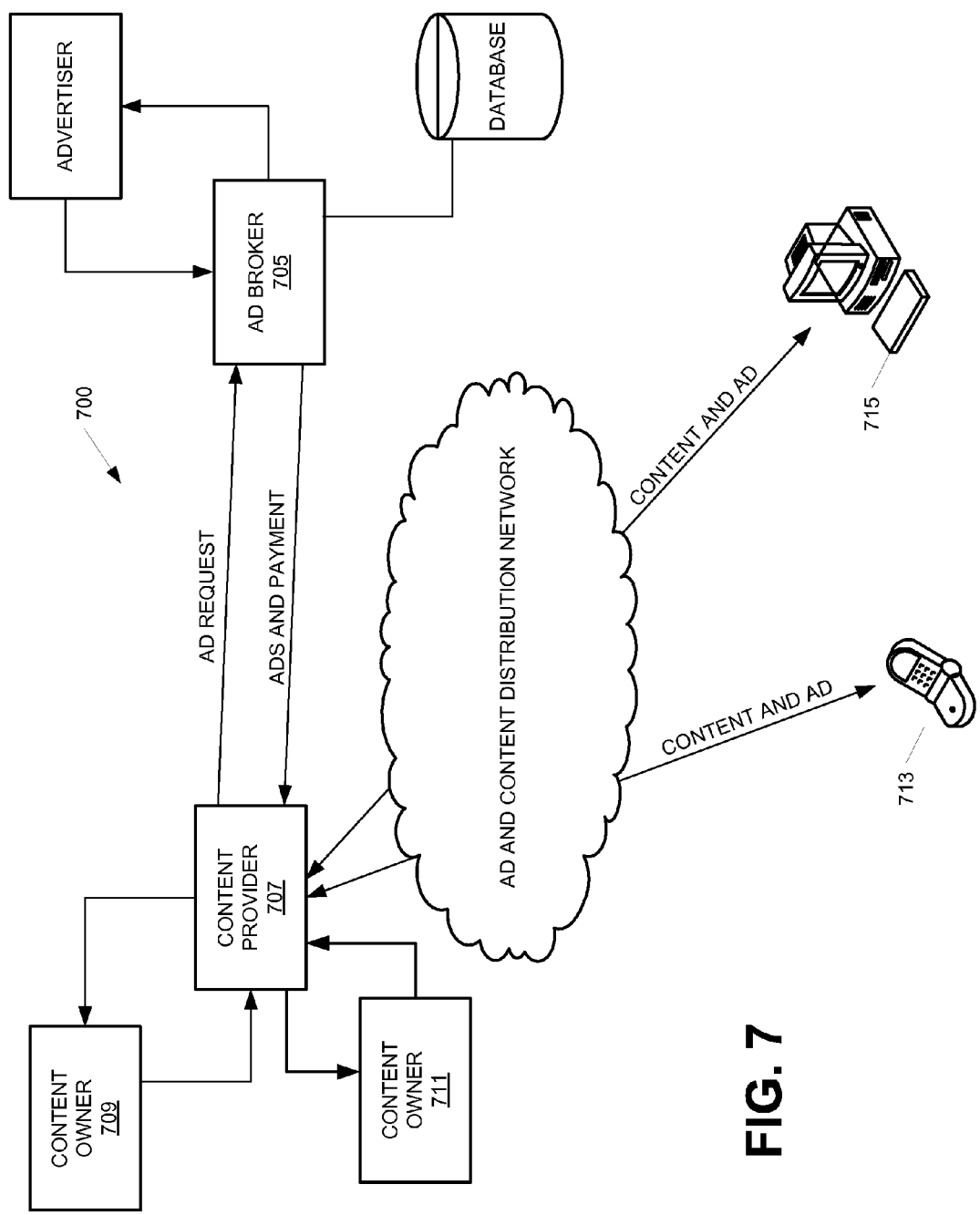
FIG. 7 illustrates an example advertisement and content distribution network according to aspects described herein.

FIG. 7 illustrates an example network flow for distributing advertisements and content to one or more requesting users. In network 700, ad broker 705 may receive advertisements from an advertiser 703 while content provider 707 may receive content items from content owners 709 and 711. User devices 713 and 715 may receive selections of desired content items from users and subsequently request the desired content from content provider 707. Content provider 707 may request advertisements from ad broker 705 by providing ad placement and selection criteria upon receiving a content item request from user devices 713 and 715. Optionally, user preferences and other profile data may also be provided to ad broker 705 as part of the ad request. The ad broker 705, upon retrieving one or more matching advertisements (e.g., by requesting ads from one or more advertisers), may respond to the content provider 707 with the matching advertisements. The requested content item may then be sent from content provider 707 to requesting user devices 713 and 715 along with the received advertisements.

Figure 8:
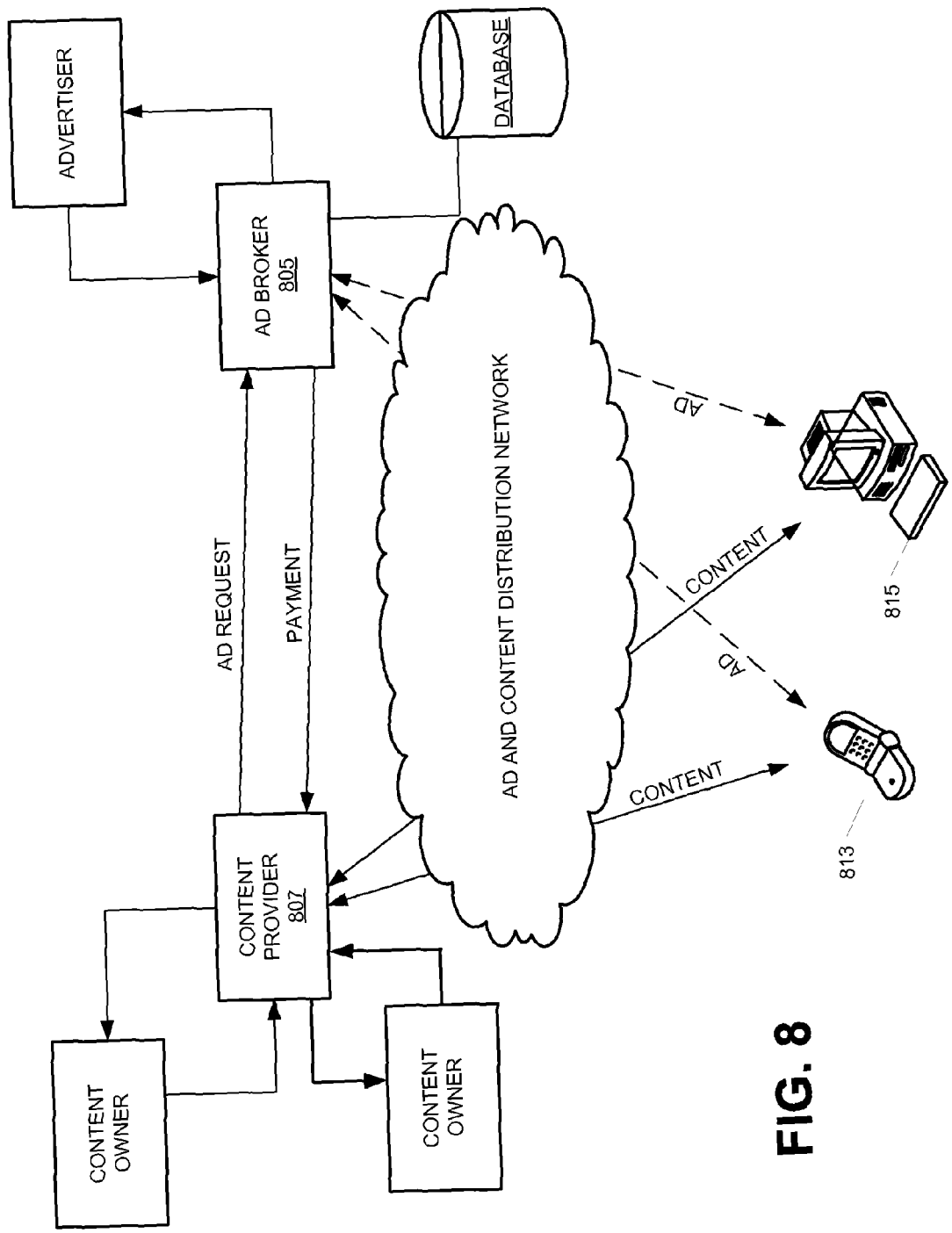
FIG. 8 illustrates another example advertisement and content distribution network according to aspects described herein.

FIG. 8 illustrates an example of an alternate network flow in which ad broker 805, instead of content provider 807, may provide advertisements to a requesting user device such as user device 813 or 815. Thus, instead of content provider 807 receiving the advertisements from the ad broker 805 and transmitting them on to the requesting user device 813 or 815 (as shown in FIG. 7) along with a requested content item, ad broker 805 may transmit the advertisements to the users directly (i.e., without use of content provider 807). User devices 813 or 815 or both may be identified to ad broker 805 by information included in an ad request from content provider 807. For instance, content provider 807 may provide an Internet protocol (IP) address of user devices 813 or 815 to ad broker 805. Thus, the content item may be delivered by content provider 807 while advertisements to be placed in the content item may be separately transmitted from ad broker 805. Additionally or alternatively, ad broker 805 may include or have access to a user profile or preferences database such as database 817. Using user profiles or preferences, ad broker 805 may more specifically tailor ad selection and placement toward the interests of and relevance to requesting user device 813 or 815. Once a matching advertisement has been received from ad broker 805, the advertisement may be combined with a content item at a specified time in user device 813 or 815. For example, a user device such as device 813 may include software, hardware, firmware or combinations thereof for video or audio processing to place the advertisement in an advertisement slot of a content item.

Figure 9:
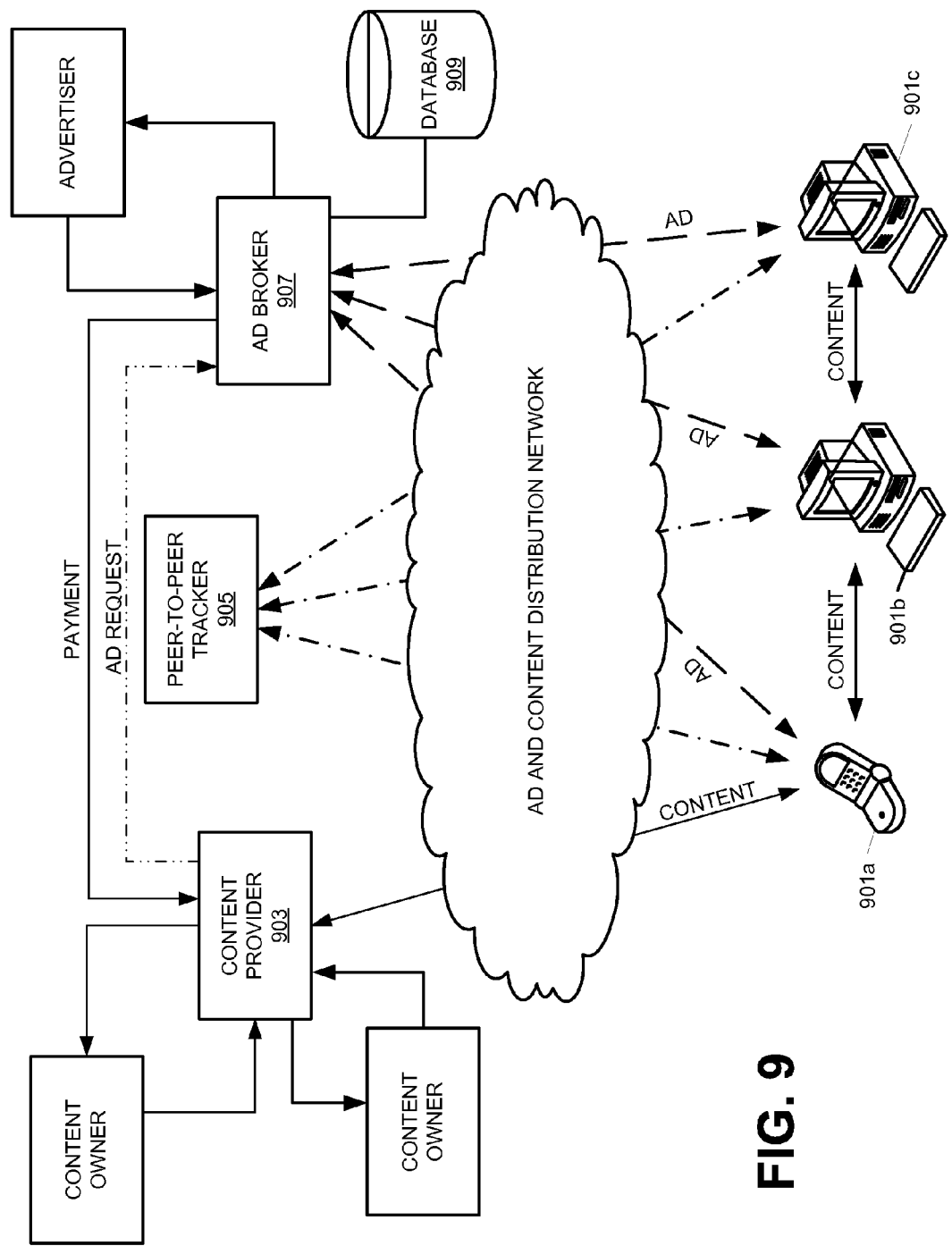
FIG. 9 illustrates another example advertisement and content distribution network according to aspects described herein.

According to another aspect, content items may be distributed in a peer-to-peer network so that a content provider does not need to be online for the distribution of content beyond an initial injection of the content to a peer device. FIG. 9 illustrates an example peer-to-peer network environment in which users 901a-c share content items amongst themselves after an initial content injection from content provider 903 into user device 901a. Sharing of content items between users 901a, b and c may be facilitated by a peer-to-peer tracker 905 that facilitates communication and transfer of content items between the users. In some peer-to-peer network arrangements, trackerless sharing may be used. Advertisements to be placed in distributed content items may be requested and received from ad broker 907 by either a user device 901a, b or c or content provider 903 and subsequently distributed to device 901a, b or c. Similar to the configuration of network of FIG. 7, ad broker 907 may also use user profile information from a user profile database 909 to place ads.

Figure 10:
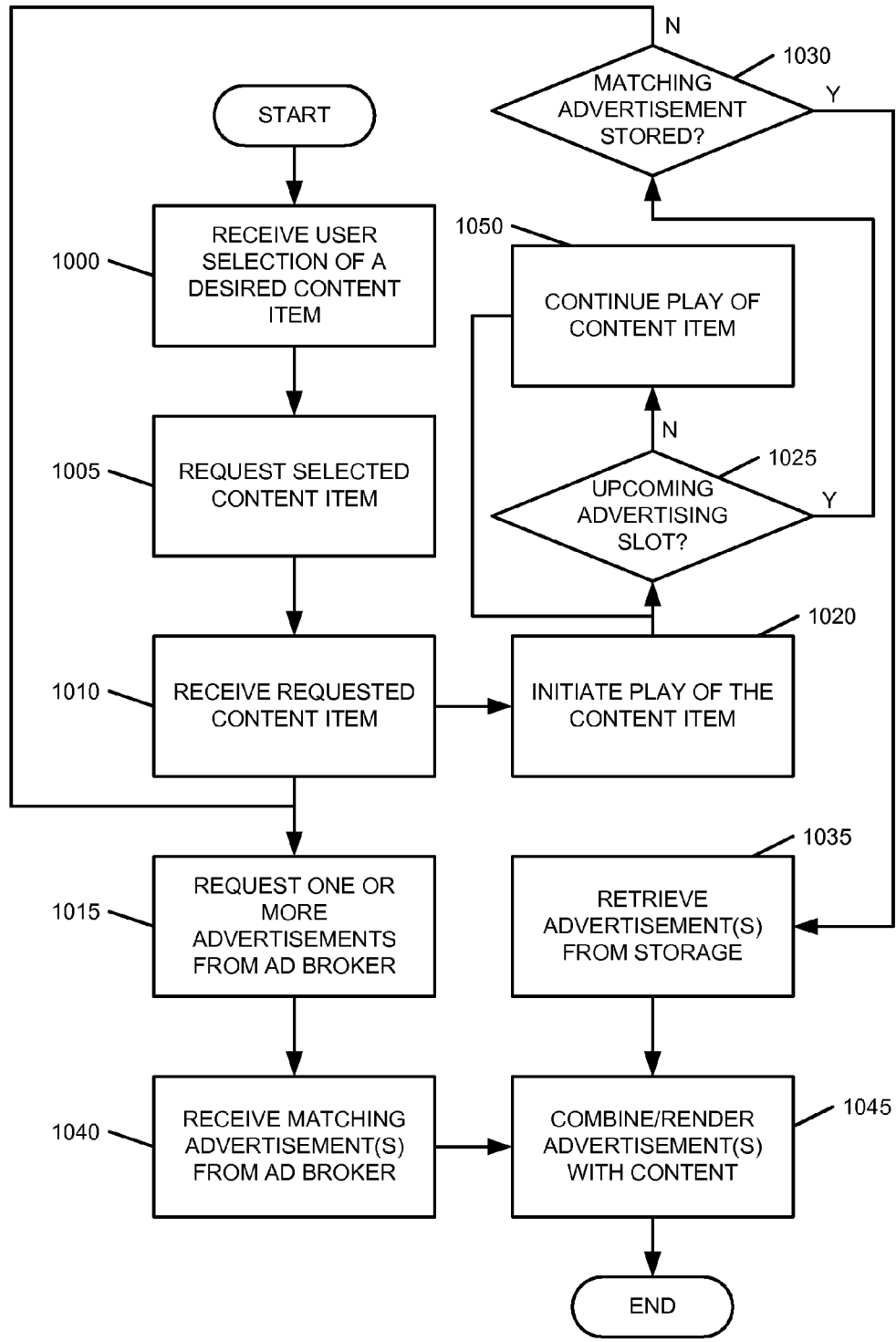
FIG. 10 is a flowchart illustrating an example method for requesting content and receiving content and advertisement according to aspects described herein.

FIG. 10 is a flowchart illustrating an example method for receiving a content item and associated advertisements according to one or more aspects of the disclosure described herein. In step 1000, a device such as mobile device 212 of FIG. 2 may receive user input corresponding to a selection of a desired content item. In step 1005, the device may request the content item. The content item may be requested in different manners and from different sources. For instance, in peer-to-peer arrangements, the device may request the content item from other users that already have the content item with assistance from a peer-to-peer tracker. In other configurations, the device may request the content item from a content provider instead. In step 1010, the device may receive the requested content item in response to the request.

Advertisements to be placed in the requested content item may be requested and/or received prior to the content item being played or during play. For example, the device may request advertisements from an ad broker based on the ad placement metadata associated with the received content item in step 1015 prior to playing or otherwise rendering the content item. In some arrangements, the device might not need to request the advertisements if the content provider has already requested them from the ad broker on the device's behalf. Alternatively, in step 1020, the device may initiate play or rendering of the content item prior to requesting advertisements. Instead, in step 1025, the device may determine whether an advertisement slot is upcoming based on the ad placement metadata associated with the content item. For example, the device may determine whether one or more advertisement slots are defined within the next 30 seconds of the content item by examining the start times indicated by the metadata. In instances where content is streamed, the content provider may provide an indication (as part of the stream or separately) of an upcoming advertisement slot to the device. If an advertisement slot is not approaching, the device may continue play of the content item in step 1050. On the other hand, if an advertisement slot is approaching, the device may determine whether an advertisement matching the ad placement criteria associated with that advertisement slot is stored within the device in step 1030 in advance. If a matching advertisement is stored within the device, the matching advertisement may be retrieved from storage in step 1035. However, if a matching advertisement is not stored in the device, the device may request one or more advertisements from an ad broker as in step 1015. The request may include the relevant ad placement metadata and optionally, user preference or profile information.

In response to an advertisement request, the device may receive one or more matching advertisements in step 1040 from the ad broker. Once matching advertisements have been identified and retrieved from either a device storage or the ad broker, the advertisements may be combined and rendered with the content item in accordance with the ad placement metadata in step 1045. For example, the device may overlay a retrieved advertisement in the content item at the specified advertisement slot time, with a specified level of transparency and/or size, at a predefined physical location within the content item and/or combinations thereof. In some instances, the device may perform editing functions to insure that an advertisement is of sufficient transparency or of the correct size. The combining or overlaying of information such as advertisements in media content is described in 3GPP TS 26.142 V7.2.0, dated December, 2007 and entitled "Dynamic and Interactive Multimedia Scenes (DIMS)," which may be found at http://www.3gpp.orgftp/Specs/archive/26_series/26.142/26142-720.zip.

Figure 11:
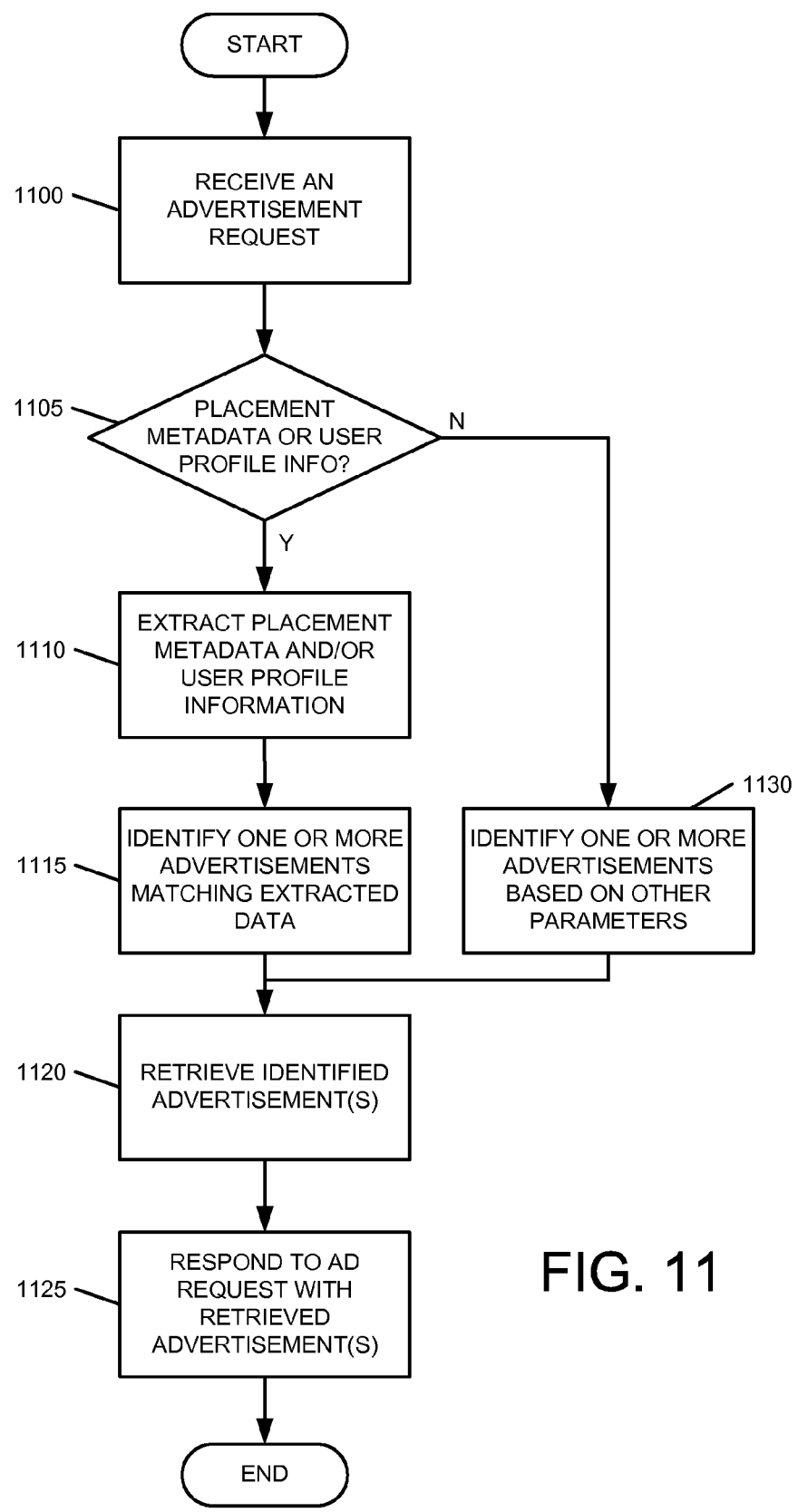
FIG. 11 is a flowchart illustrating an example method for processing an advertisement request according to aspects described herein.

FIG. 11 is a flowchart illustrating an example method by which an ad broker or provider responds to advertisement requests. In step 1100, an ad broker may receive an advertisement request. The request may be received from a user device requesting content items or from a content provider configured to provide content items to a user as described herein. In step 1105, the ad broker may determine whether ad placement metadata and/or user profile/preference information is included in the request. If so, such data may be extracted from the request in step 1110. In step 1115, the ad broker may identify one or more advertisements that match the ad placement metadata, the user profile/preference information or both. In one example, the ad broker may include a database storing an index of available advertisements along with characteristics thereof. Thus, the ad broker may be able to match preferences and placements information such as length of advertisement, advertisement rating, gender of the viewer, physical size of the advertisement, content of the advertisement and the like with the known ad characteristics to identify one or more matching ads. Upon identifying one or more suitable ads, the ad broker may retrieve the identified ads from either a local database or from the advertiser associated with the identified ads in step 1120. For instance, in the above example relating to an index of available advertisements, the ad broker may request a matching ad from an advertiser using location information stored as part of the index. The ad broker may then transmit the ads to the requesting party in step 1125. On the other hand, if no placement metadata or user profile information is included in available, advertisements may be identified based on other parameters and using other techniques in step 1030.

Figure 12:
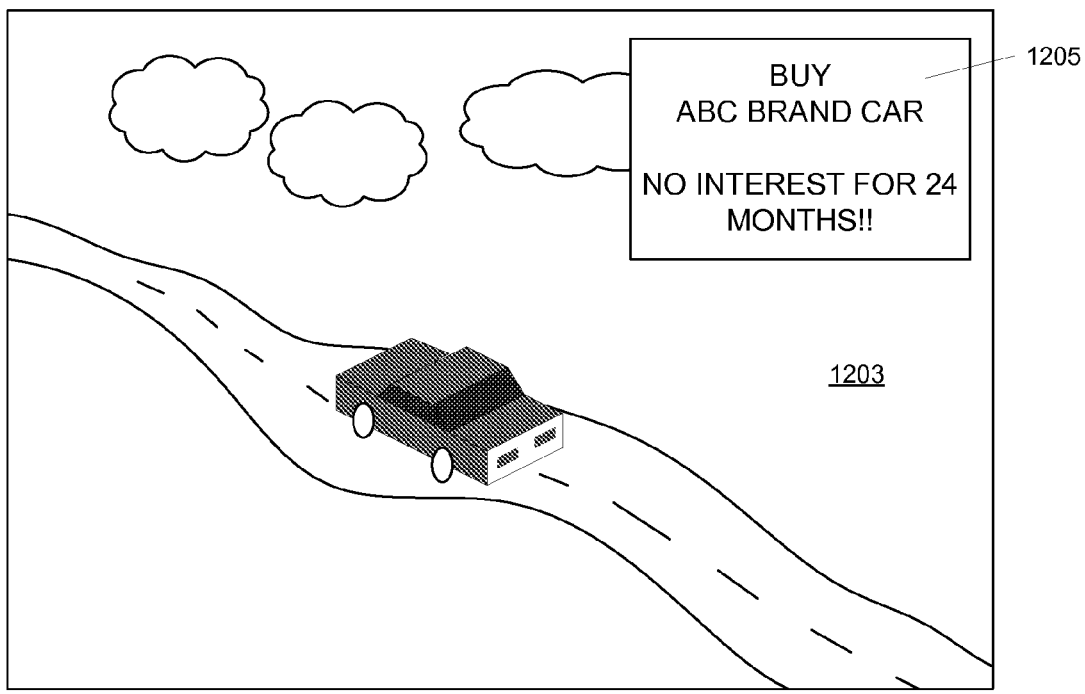
FIG. 12 illustrates an example video image in which an advertisement has been placed according to aspects described herein.

FIG. 12, one example embodiment, illustrates an example of an advertisement 1205 overlaid on an upper right quadrant of a video 1203. The size, placement location and transparency level of the advertisement 1205 may be defined by ad placement metadata stored in association with the video content 1203.

While many non-contextual ad placement criteria and specifications have been discussed, the aspects described herein may equally be applied to contextual attributes. For example, ad placement metadata may include contextual information as described in further detail below. Contextual matching of advertisement to content may help increase advertising and product revenues. In one example, if a movie scene relates to wedding planning and selecting a dress, then placement of an advertisement related to a wedding dress designer or store in association with the movie scene may be particularly relevant and desired.

Figure 13:
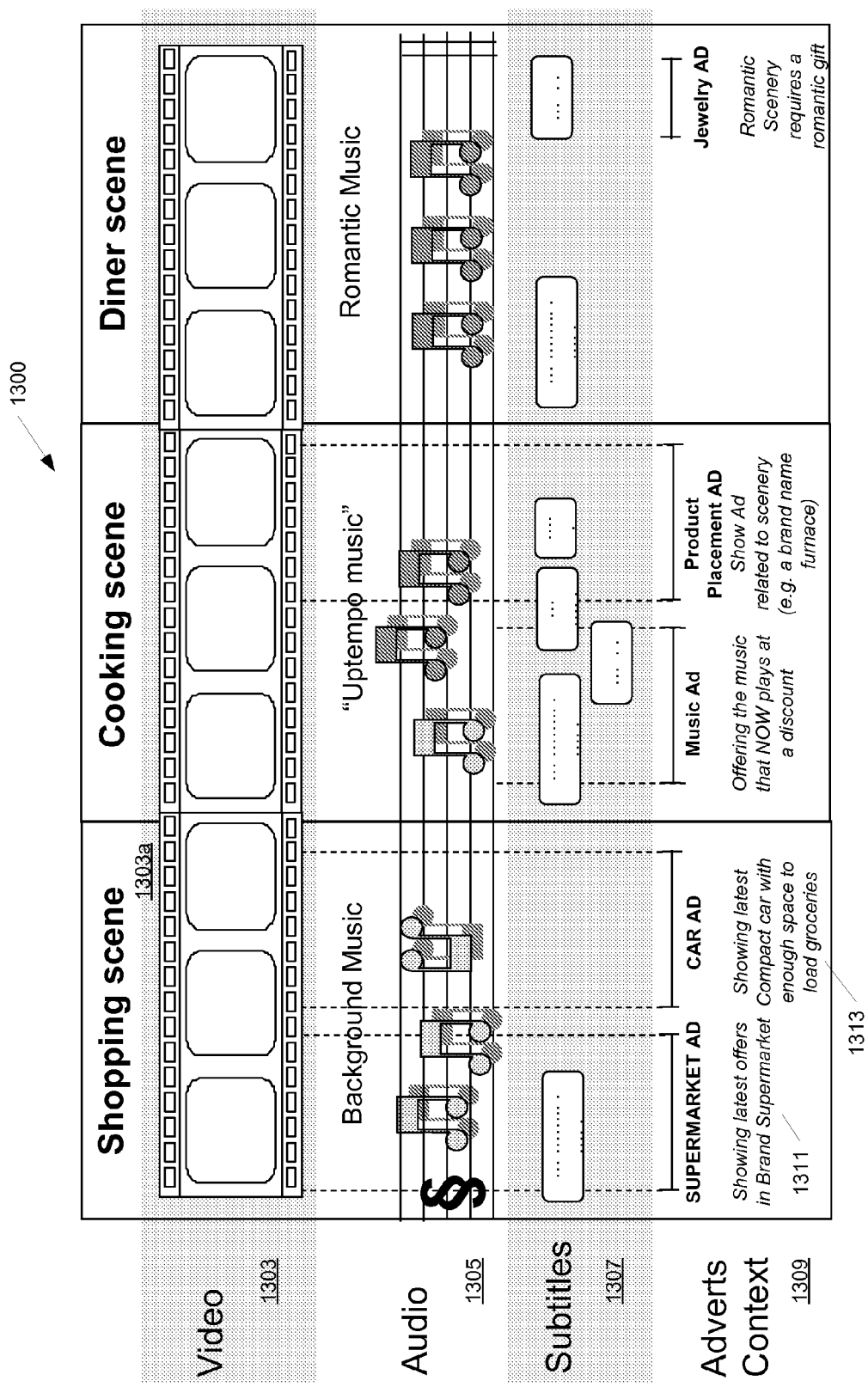
FIG. 13 illustrates an example content data structure including a context data track according to aspects described herein.

FIG. 13, one example embodiment, illustrates a content data structure 1300 that is configured to store not only the data that is to be rendered during playback (e.g., video track 1303, audio track 1305 and subtitles 1307), but also a contextual data track 1309 that identifies the context of one or more portions of the content item using keywords or other data keyed to the content based on time. That is, keywords, metadata or other types of contextual data may be stored in association with a particular runtime of the content. Thus, during shopping scene 1303a, contextual data track 1309 may provide keywords or descriptions 1311 and 1313 indicating that the current scene or portion of the content relates to shopping at a supermarket with a compact car. Accordingly, a supermarket advertisement or a car advertisement or both may be placed in that portion of the content instead of a cleaning service ad or other ads unrelated to shopping. Keywords may relate to, for example, a profession, an activity, a type of product, the name of a musical artist, a song or album title, brand name, travel destinations and the like. In addition to contextual data, the contextual data track 1309 may include other ad placement information. For example and as discussed herein, other ad placement information may include a start time for an advertisement (i.e., beginning of an advertisement slot), a duration of the advertisement, a physical size of the ad and a transparency of the ad. Thus, in addition to contextual matching, ads may be required or requested to match one or more other ad placement criteria. In one example embodiment, the contextual data track 1309 may be stored as metadata of a content item e.g., advertisement metadata 509 of FIG. 5 and used for selection of an advertisement.

Moreover, while contextual data tracks such as track 1309 and other ad placement specifications may be defined prior to distribution or rendering of the content item to reduce the processing required by a viewing device, such data may also be generated on the fly (i.e., during rendering). For example, a rendering device such as mobile device 212 (FIG. 2) may be configured to perform audio or image processing to identify keywords based on the audio, video and subtitle tracks. Specifically, one or more keywords may be determined using natural language recognition or image recognition methods such as optical character recognition (OCR). In another example, contextual data and/or other metadata may automatically be generated by another entity such as a content provider, owner or distributor. The processing may be performed for future portions of the content to ensure the timeliness of ad retrieval and placement.

Figure 14:
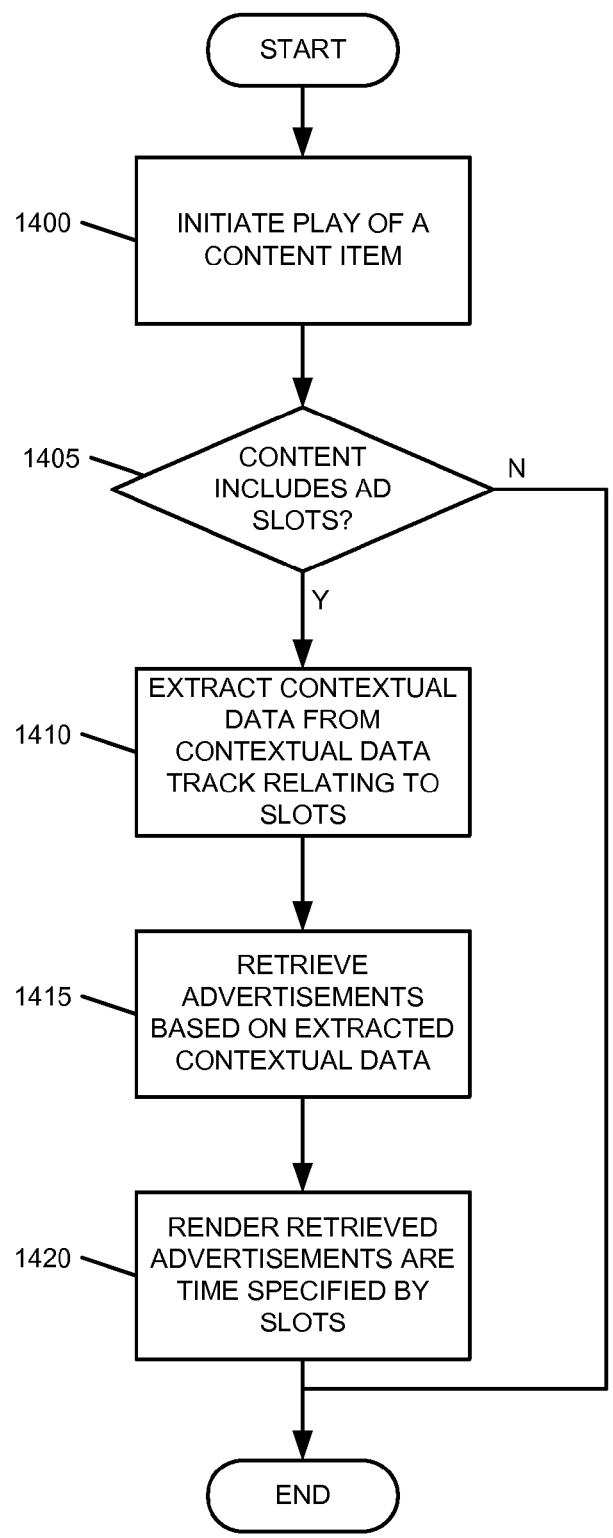
FIG. 14 is a flowchart illustrating an example method for placing advertisements in a content item based at least in part on contextual data according to aspects described herein.

FIG. 14, one example embodiment, is a flowchart illustrating a method of retrieving advertisements based at least in part on contextual data. In step 1400, a rendering device may initiate play of a content item. The content may include audio, video, text and/or combinations thereof. In step 1405, the rendering device may determine whether the content item includes one or more advertisement slots. The rendering device may make such a determination for the entire content item or for a predefined portion. For example, during play of the content, the rendering device may look ahead a predefined amount of time (e.g., 30 seconds, 1 minute, 5 minutes) to determine if any advertisement slots are approaching. Advertisement slots may be identified by evaluating ad placement metadata such as contextual keywords keyed to a portion of the content.

If the rendering device determines that the content item includes one or more advertisement slots, the rendering device may extract the relevant contextual data from the contextual data track in step 1410. Contextual data may include keywords, phrases, images, names and the like. In step 1415, the rendering device may retrieve advertisements based at least in part on the extracted contextual data. Retrieval may include requesting advertisements from an ad provider or, alternatively or additionally, determining if the rendering device has one or more advertisements matching the contextual data stored and if so, retrieving the advertisements from storage. Once retrieved, the advertisements may be rendered at a specified time (i.e., time specified in the advertisement slot metadata) by the rendering device in step 1420.

As discussed herein with respect to non-contextual ad placement metadata, in some embodiments, ad processing may be performed prior to rendering of the content. Further, in some instances, contextual ad processing may be performed by a content provider such that the content provider provides the content item along with matching advertisements to the rendering device. Alternatively, the advertisements may be sent separately to the rendering device from the ad broker.

Figure 15:
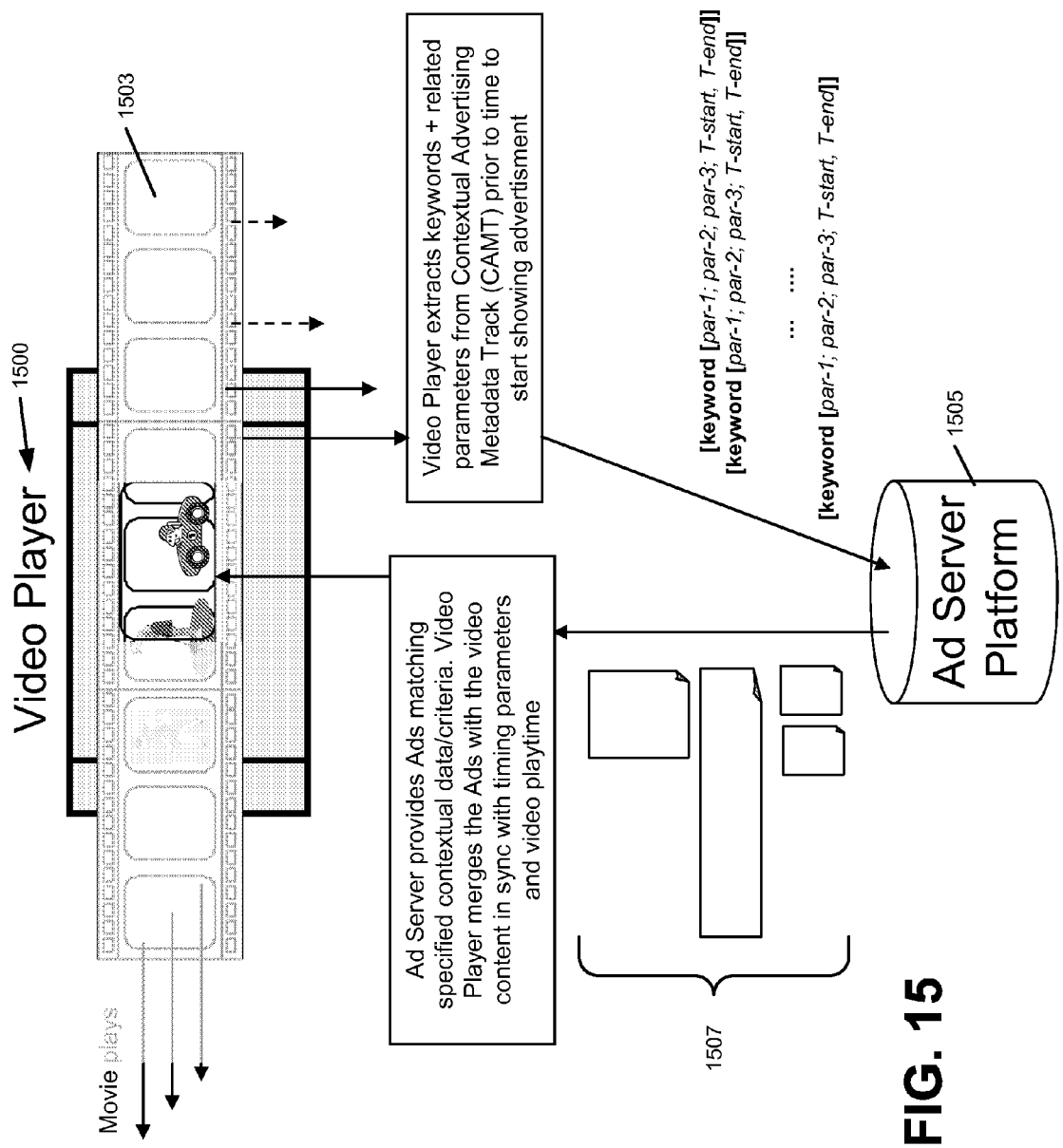
FIG. 15 illustrates an example of data flow between a video player and an advertisement server according to aspects described herein.

FIG. 15, one example embodiment, illustrates an example data flow for retrieving advertisements during content rendering. Video player 1500 may be configured to not only play the video content 1503, but to also identify ad placement data such as context information and ad placement specifications and retrieve advertisements based at least in part on the data. Accordingly, during play of video content 1503, video player 1500 may extract keywords from metadata of video content 1503 and request advertisements from an ad broker or server 1505. The extraction and request may be performed a predefined amount of time prior to the beginning of the advertisement slot corresponding to the ad placement data to ensure that the advertisement is received and rendered on time. In response to player 1500's request, one or more advertisements 1507 may be received from ad server 1505. Video player 1500 may include hardware components, software components, firmware components and/or combinations thereof.

Figure 16:
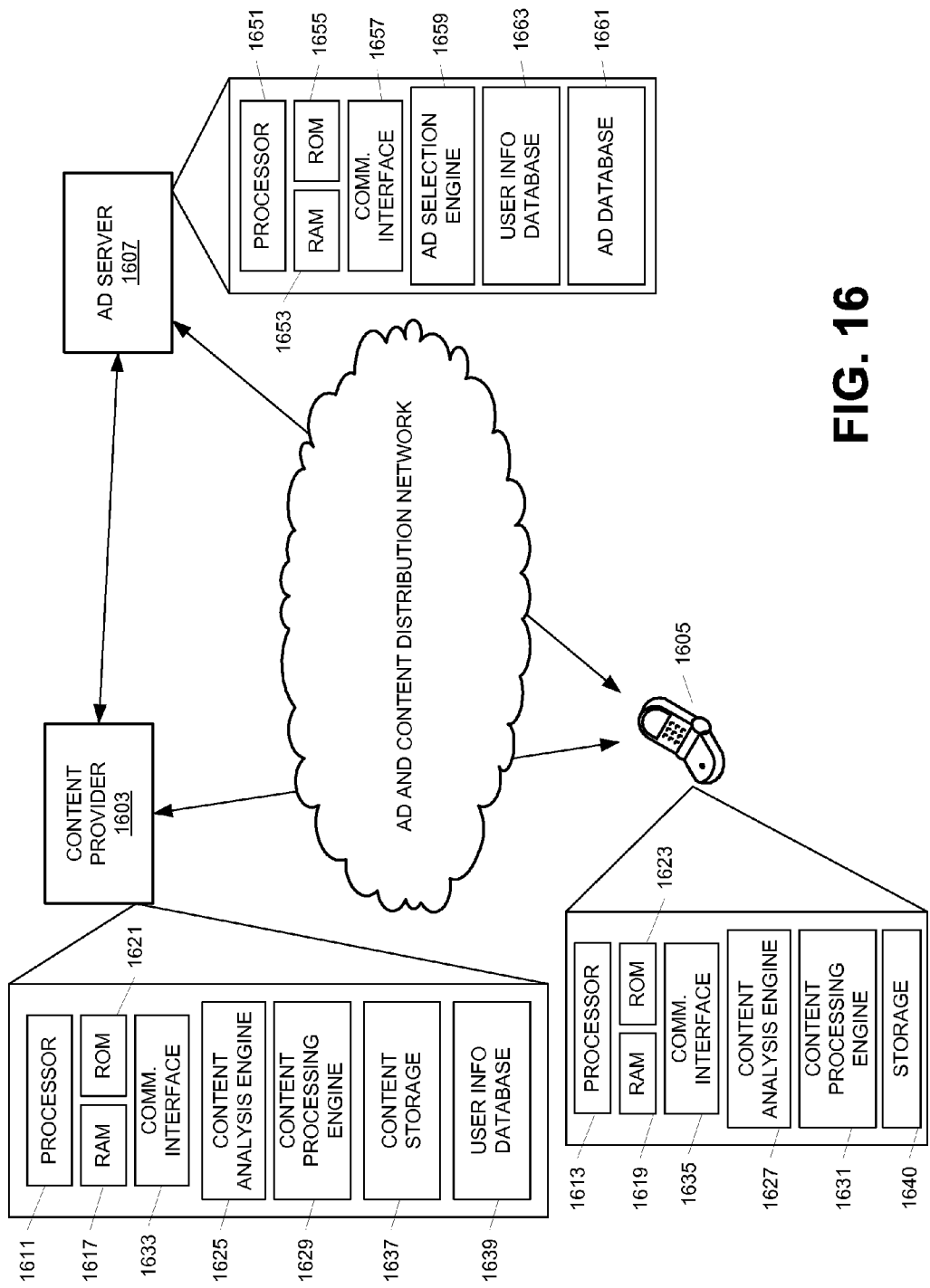
FIG. 16 illustrates examples of components of an advertisement and content distribution network according to aspects described herein.

FIG. 16, one example embodiment, illustrates entities within a network environment for distributing content items and advertisements. Network 1600 includes content provider 1603, user device 1605 and advertisement server 1607. Content provider 1603 and user device 1605 may include many of the same components including a processor (1611, 1613), memory such as RAM (1617, 1619) and ROM (1621, 1623), a content analysis engine (1625, 1627), a content processing engine (1629, 1631) and a communication interface (1633, 1635). Processors 1611 and 1613 may be configured to execute instructions causing various components such as content analysis engines 1617 and 1619, respectively, to perform various functions. Content analysis engines 1617, 1619 may be configured to examine content items and extract contextual information or other ad placement metadata therefrom. The contextual information and other ad placement metadata may then be transmitted through communication interfaces 1633, 1635 to advertisement server 1607 as part of an advertisement request. Content processing engines 1629, 1631 may be configured to insert or otherwise associate the received advertisement(s) with the content item upon receiving one or more advertisements from advertisement server 1607.

Content provider 1603 may further include user information database 1639 configured to store preferences and other profile information about users and content storage 1637 configured to store one or more content items so that they may be retrieved locally. Alternatively, if a requested content item is not stored in content storage 1637, the content item may be requested from a content owner or other provider. User Device 1635 may further include a storage device 1640 for storing various data such as downloaded content, advertisements user information and the like. In one or more configurations, communication interface 1635 of device 1605 may be configured for peer-to-peer networking.

Advertisement server 1607 may include components similar to those included in user device 1605 and provider 1603 such as a processor 1651, memory 1653 and 1655 and communication interface 1657. In addition, advertisement server 1607 may include an ad selection engine 1659, advertisement database 1661 and user information database 1663. Communication interface 1657 may be used to receive advertisement requests from either user device 1605 or provider 1603 or both and to respond thereto. Additionally, communication interface 1657 may be configured to request and receive advertisements from one or more advertisers. Advertisement database 1661 may be configured to store advertisements to reduce retrieval times. For example, database 1661 may store advertisements that are to be more frequently distributed or that tend to match more requests than others.

User information database 1663, on the other hand, may store user profile information including interests, gender, geographic location, age and the like. Ad selection engine 1659 may be configured to select advertisements based at least in part on criteria received in an advertisement request (e.g., contextual information or other ad placement criteria), user profile information or both. Advertisement database 1661 may store an index of all advertisements served by the advertiser whether or not they are stored in database 1661. The index may further identify a location of the advertisement as well as one or more attributes (e.g., content rating, subject matter, keywords) thereof. Other components may also be included in advertisement server 1607 in accordance with needs or desired functionality.

While advertisement placement metadata and contextual data tracks have been described as being stored in a content item, such data may also be stored separately, e.g., as a separate file. Accordingly, in one or more configurations, advertisement placement metadata may be transmitted or processed separately from a content item file. If stored separately, the metadata and the content item may be associated using logical links (e.g., corresponding identification numbers) or other identification and linking mechanisms. Further, other media content besides advertisements may, alternatively or additionally, be placed using metadata and contextual tracks. For example, music, subtitles, public service announcements and the like may be added to a movie using contextual data track information and/or media content placement metadata in one or more media content slots. Media content slots may be defined similar to the definition of advertisement slots. Accordingly, in one or more arrangements, an ad broker may be or include a media content broker or server.

It should be understood that any of the method steps, procedures or functions described herein may be implemented using one or more processors in combination with executable instructions that cause the processors and other components to perform the method steps, procedures or functions. As used herein, the terms "processor" and "computer" whether used alone or in combination with executable instructions stored in a memory or other computer-readable storage medium should be understood to encompass any of various types of well-known computing structures including but not limited to one or more microprocessors, special-purpose computer chips, field-programmable gate arrays (FPGAS), controllers, application-specific integrated circuits (ASICS), combinations of hardware/firmware/software, or other special or general-purpose processing circuitry.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

I claim:

1. A method comprising:
   embedding placement criteria in a content item;
   determining whether a portion of the content item corresponds to a media content slot, using a processor;
   in response to determining that the portion of the content item corresponds to the media content slot, determining contextual information relating to the portion of the content item, using a processor; and
   retrieving media content based at least in part on the determined contextual information.

2. The method of claim 1, wherein determining whether the portion of the content item corresponds to the media content slot is performed during play of the content item.

3. The method of claim 1, wherein the content item includes a predefined contextual information track and at least one of a video track and an audio track, wherein the contextual information is determined from the predefined contextual information track.

4. The method of claim 3, wherein the portion of the content item is defined by a specified time and wherein the contextual information is keyed to the specified time.

5. The method of claim 1, wherein the retrieved media content includes one or more advertisements and wherein the method further comprises retrieving the media content includes transmitting an advertisement request to an advertisement server, the request including the determined contextual information.

6. The method of claim 1, wherein the media content includes one or more advertisements.

7. The method of claim 1, wherein the content item includes a streaming video.

8. The method of claim 1, further comprising causing, at least in part, transmission of the retrieved media content and the content item to a requesting user.

9. The method of claim 1, wherein the contextual information is determined during play of the content item.

10. The method of claim 1, wherein retrieving the media content based at least in part on the determined contextual information includes retrieving the media content matching, at least in part, the determined contextual information.

11. The method of claim 1, wherein retrieving the media content is further based at least in part on one of: user preferences and user demographics.

12. An apparatus comprising:
    at least one processor; and
    at least one memory including computer program code,
    the at least one memory and the computer program code configured to, with the at least one processor, cause the apparatus to perform at least the following,
    embed placement criteria into a content item;
    determine whether a portion of the content item corresponds to a media content slot;
    in response to determining that the portion of the content item corresponds to the media content slot, determine contextual information relating to the portion of the content item; and
    retrieve media content based at least in part on the determined contextual information.

13. The apparatus of claim 12, wherein the apparatus is a server providing the content item to a requesting user.

14. The apparatus of claim 13, wherein the computer program code, when executed, further cause the at least one processor to cause, at least in part, transmission of the retrieved media content with the content item to the requesting user.

15. The apparatus of claim 12, wherein the computer program code, when executed, cause the at least one processor to determine whether the portion of the content item corresponds to the media content slot during play of the content item.

16. The apparatus of claim 12, wherein the content item includes a predefined contextual information track and at least one of a video track and an audio track, wherein the contextual information is determined from the predefined contextual information track.

17. The apparatus of claim 16, wherein the portion of the content item is defined by a specified time and wherein the contextual information is keyed to the specified time.

18. The apparatus of claim 12, wherein retrieval of the media content includes transmitting a media content request to a media content server, the request including the determined contextual information.

19. An apparatus comprising:
    at least one processor; and
    at least one memory including computer program code,
    the at least one memory and the computer program code configured to, with the at least one processor, cause the apparatus to perform at least the following,
    embedding placement criteria into a content item;
    determining whether a portion of the content item corresponds to an media content slot;
    in response to determining that the portion of the content item corresponds to the media content slot, determining contextual information relating to the portion of the content item; and
    retrieving media content based at least in part on the determined contextual information.

20. The apparatus of claim 19, wherein determining whether the portion of the content item corresponds to the media content slot is performed during play of the content item.

21. The apparatus of claim 19, wherein the content item includes a predefined contextual information track and at least one of a video track and an audio track, wherein the contextual information is determined from the predefined contextual information track.

22. The apparatus of claim 21, wherein the portion of the content item is defined by a specified time and wherein the contextual information is keyed to the specified time.

23. The apparatus of claim 19, wherein retrieving the media content includes transmitting a media content request to a media content server, the request including the determined contextual information.

24. A method comprising:
receiving a media content request including one or more contextual criteria associated with at least a portion of a content item to which the media content request relates, using a processor;
embedding placement criteria into the content item;
determining media content matching the one or more contextual criteria, using a processor; and
in response to the media content request, providing the matching media content.

25. The method of claim 24, wherein the one or more contextual criteria include keywords stored in a contextual information track of the content item.

26. The method of claim 24, wherein the matching media content is further determined based at least in part on user profile information of a user requesting the content item.

27. The method of claim 26, wherein the user profile information is included in the media content request.

28. An apparatus comprising:
at least one processor; and
at least one memory including computer program code, the at least one memory and the computer program code configured to, with the at least one processor, cause the apparatus to perform at least the following,
receive a media content request including one or more contextual criteria associated with at least a portion of a content item to which the media content request relates;
embed placement criteria into the content item;
determine media content matching the one or more contextual criteria; and
in response to the media content request, provide the matching media content.

29. The apparatus of claim 28, wherein the one or more contextual criteria include keywords stored in a contextual information track of the content item.

30. The apparatus of claim 28, wherein the matching media content is further determined based at least in part on user profile information of a user requesting the content item.

31. An apparatus comprising:
at least one processor; and
at least one memory including computer program code,
the at least one memory and the computer program code configured to, with the at least one processor, cause the apparatus to perform at least the following,
receiving a media content request including one or more contextual criteria associated with at least a portion of a content item to which the media content request relates;
embedding placement criteria into the content item;
determining media content matching the one or more contextual criteria; and
providing the matching media content in response to the media content request.

32. The apparatus of claim 31, wherein the one or more contextual criteria include keywords stored in a contextual information track of the content item.

33. The apparatus of claim 31, wherein the matching media content is further determined based at least in part on user profile information of a user requesting the content item.

34. The apparatus of claim 31, wherein the media content includes one or more advertisements.

* * * * *